US009359534B2

(12) United States Patent
Urbach et al.

(10) Patent No.: US 9,359,534 B2
(45) Date of Patent: Jun. 7, 2016

(54) HOT-MELT ADHESIVES WITH IMPROVED ADHESION ON LOW-ENERGY SURFACES

(75) Inventors: Dirk Urbach, Ahrensburg (DE); Kai Paschkowski, Jork (DE); Martin Linnenbrink, Apensen (DE)

(73) Assignee: SIKA TECHNOLOGY AG, Baar (CH)

( * ) Notice: Subject to any disclaimer, the term of this patent is extended or adjusted under 35 U.S.C. 154(b) by 87 days.

(21) Appl. No.: 13/405,944

(22) Filed: Feb. 27, 2012

(65) Prior Publication Data

US 2012/0171466 A1 Jul. 5, 2012

Related U.S. Application Data

(63) Continuation of application No. PCT/EP2010/062488, filed on Aug. 26, 2010.

(30) Foreign Application Priority Data

Aug. 26, 2009 (EP) ..................................... 09168705

(51) Int. Cl.
```
B32B 7/12      (2006.01)
B32B 37/12     (2006.01)
C09J 123/02    (2006.01)
C09J 123/12    (2006.01)
C08L 23/08     (2006.01)
C08L 23/22     (2006.01)
C08L 51/00     (2006.01)
```

(52) U.S. Cl.
CPC ............ C09J 123/12 (2013.01); *C08L 23/0815* (2013.01); *C08L 23/22* (2013.01); *C08L 51/003* (2013.01); *Y10T 428/249982* (2015.04); *Y10T 428/31801* (2015.04)

(58) Field of Classification Search
CPC ........... B32B 7/12; B32B 37/12; C09J 123/02
USPC .................... 524/487, 111; 428/317.7, 484.1; 156/334
See application file for complete search history.

(56) References Cited

U.S. PATENT DOCUMENTS

| | | |
|---|---|---|
| 4,065,924 A | 1/1978 | Young |
| 5,998,547 A | 12/1999 | Hohner |
| 2004/0081795 A1 | 4/2004 | Wang et al. |
| 2004/0115456 A1* | 6/2004 | Kanderski et al. ............ 428/500 |
| 2004/0249046 A1* | 12/2004 | Abhari et al. ................. 524/474 |
| 2006/0074171 A1* | 4/2006 | Bach et al. .................... 524/487 |
| 2006/0235134 A1 | 10/2006 | Bach et al. |
| 2007/0117894 A1 | 5/2007 | Bach et al. |
| 2008/0262148 A1 | 10/2008 | Bach et al. |

FOREIGN PATENT DOCUMENTS

| | | | |
|---|---|---|---|
| EP | 2 172 529 A1 | 4/2010 | |
| JP | 2006-503966 A | 2/2006 | |
| JP | 4278704 B1 | 6/2009 | |
| WO | WO9711110 A1 * | 3/1997 | ................ C08J 3/00 |
| WO | 2004/039906 A1 | 5/2004 | |

OTHER PUBLICATIONS

Eastman Tackifier Center—Softening Point—2013 http://www.eastman.com/Markets/Tackifier_center/Tackifier_selection/compatibility/Pages/softening_Point.aspx.*
Clariant—Licowax, Ceridust, Licolub, Licomont, Licocene—General Leaflet—Waxes—Apr. 19, 2012 http://www.clariant.com/C12576850036A6E9/A958505C28F2D54EC1257A4C003F392B/$ FILE/DA8048E.pdf.*
Eastman Regalite R1125 Hydrocarbon Product Data Sheet—2013 http://www.eastman.com/Pages/ProductHome.aspx?product=71049284.*
MatWeb—Evonik Corporation Vestoplast 708 Amorphous Polyalpholefin—http://www.matweb.com/search/datasheet.aspx?MatGU I D=786295d7e923419aac9234d315e7fa6f.*
Wingtack r 10—Liquid Tackifying Resin—http://www.crayvalley.com/docs/TDS/wingtack-10-(1).pdf.*
Westlake Chemical Company—"Typical Properties of Epolene Polymers" —http://www.westlake.com/_filelib/FileCabinet/pdfs/Epolene/MSDS/SummaryProperties_of_Epolene_Polymers.pdf?FileName=SummaryProperties_of_Epolene_Polymers.pdf—Pub. Apr. 22, 2009.*
REXtac RT 2715 Amorphous Polyalphaolefin (APAO) data sheet http://www.matweb.com/search/datasheet.aspx?MatGUID=70c087bfa3ae46d96791ec904cec6cac&ckck=1 Downloaded—Mar. 23, 2015.*
Westlake Chemical—Epolene E-43 Polymer Product Data Sheet http://www.chempoint.com/products/download?grade=15453&type-tds Downloaded—Mar. 22, 2015 Online—Jun. 17, 2008.*
Notification of Transmittal of Translation of the International Preliminary Report on Patentability (Forms PCT/IB/338 and PCT/IB/373) and the Written Opinion of the International Searching Authority (Form PCT/ISA/237) issued on Mar. 15, 2012, in corresponding International Application No. PCT/EP2010/062488. (7 pages).
International Search Report (PCT/ISA/210) issued on Oct. 11, 2010, by European Patent Office as the International Searching Authority for International Application No. PCT/EP2010/062488.
Office Action (Notice of Reasons for Rejection) issued Jan. 21, 2014, by the Japanese Patent Office in corresponding Japanese Patent Application No. 2012-526063, and an English Translation of the Office Action. (7 pages).

\* cited by examiner

*Primary Examiner* — Ling Choi
*Assistant Examiner* — Ronald Grinsted
(74) *Attorney, Agent, or Firm* — Buchanan Ingersoll & Rooney PC

(57) ABSTRACT

A hot-melt adhesive composition, the use thereof, and a composite body including the hot-melt adhesive composition. The hot-melt adhesive composition includes a polyolefin P, which is solid at 25° C., a soft resin WH with a softening point between −10° C. and 40° C., and a polar modified polyolefin wax PW.

21 Claims, 1 Drawing Sheet

HOT-MELT ADHESIVES WITH IMPROVED ADHESION ON LOW-ENERGY SURFACES

RELATED APPLICATION(S)

This application claims priority as a continuation application under 35 U.S.C. §120 to PCT/EP2010/062488, which was filed as an International Application on Aug. 26, 2010 designating the U.S., and which claims priority to European Application No. 09168705.3 filed in Europe on Aug. 26, 2009. The entire contents of these applications are hereby incorporated by reference in their entireties.

FIELD

Disclosed are hot-melt adhesives, for example, laminating adhesives.

BACKGROUND INFORMATION

Hot-melt adhesives are used as laminating adhesives. In the construction industry, waterproof membranes for sealing bases against breakthrough of water have also been used. By way of example, U.S. Pat. No. 4,065,924 describes a barrier layer connected with a top layer, wherein the barrier layer is arranged on the base and the top layer ensures the bond with the poured concrete by being permeated by the poured concrete.

Such waterproof membranes can comprise hot-melt adhesives, which serve as laminating adhesives in order to ensure the bond between the barrier layer and the top layer or directly with the applied concrete. Such hot-melt adhesives can have a variety of properties. In the cured state, the bond strength of the hot-melt adhesive to the barrier layer and the top layer can be high to ensure an optimum protection of the concrete against humidity and water from the base even if the waterproof membrane is damaged. A good adhesion to low-energy materials can be advantageous since in most cases, the barrier layer is prepared from such materials. The adhesion build-up on polyolefin-based materials, for example, polyethylene, can be difficult. In order to ensure the resistance to penetrating water as well, the hot-melt adhesive can penetrate deeply into the top layer before curing. Ideally, after application on the top layer, the concrete penetrates the hot-melt adhesive and binds to the hot melt adhesive, thus resulting in a high resistance to penetrating water. In order to achieve a good binding to concrete, the hot-melt adhesive can have a high inherent tackiness and be as soft as possible after curing. In the case of penetrating water, a high resistance to hydrolysis can be advantageous. In addition, the hot-melt adhesive can have a certain initial tackiness prior to curing in order to enable the barrier layer to bond to the top layer in the industrial manufacture of waterproof membranes.

SUMMARY

According to an exemplary aspect, a hot-melt adhesive composition is provided, comprising: a) a polyolefin P, which is solid at 25° C.; b) at least one soft resin WH with a softening point, measured by the Ring-And-Ball Method according to DIN EN 1238, between −10° C. and 40° C.; and c) at least one polar-modified polyolefin wax PW.

According to another exemplary aspect, a method of bonding is provided, comprising bonding a first substrate to a second substrate with the hot-melt adhesive composition according to claim 1.

According to another exemplary aspect, a composite body is provided, comprising: a first substrate S1, which is a polyolefin film; the hot-melt adhesive composition according to claim 1; and a second substrate S2; wherein the hot-melt adhesive composition is arranged between the first substrate S1 and the substrate S2.

DETAILED DESCRIPTION

Figure 1:
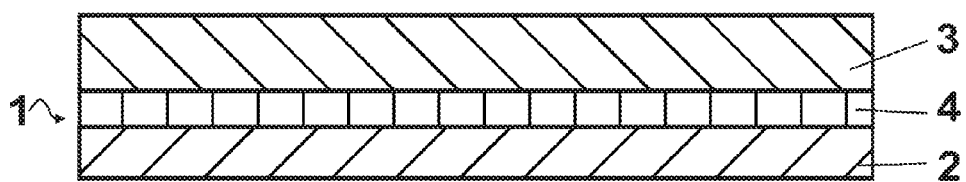
FIG. 1 is a cross-sectional view of a composite body, according to an exemplary aspect.

Accordingly to an exemplary embodiment, provided are hot-melt adhesives which have a broad adhesive spectrum and adhere well, for example, to low-energy surfaces such as polyolefin films, for example, polyethylene films.

The hot-melt adhesive compositions can be very advantageous with regard to aspects of occupational hygiene and work safety.

Other exemplary aspects of the present disclosure are the use of the hot-melt adhesive composition for adhesively bonding polyolefin films, foams or fiber materials and a composite body.

In a first aspect, the present disclosure pertains to a hot-melt adhesive composition comprising
a) a polyolefin P, which is solid at 25° C.;
b) at least one soft resin WH with a softening point, measured by the Ring-And-Ball Method according to DIN EN 1238, between −10° C. and 40° C.;
c) at least one polar-modified polyolefin wax PW;

In the present document, all softening points are to be understood as softening points measured by the Ring-And-Ball Method according to DIN EN 1238.

For example, the polyolefin P has a softening point, measured by the Ring-And-Ball Method according to DIN EN 1238, between 70° C. and 170° C., for example, between 80° C. and 120° C., for example, between 90° C. and 110° C.

For example, the polyolefin P is a thermoplastic poly-α-olefin, for example, an atactic poly-α-olefin (APAO).

These atactic poly-α-olefins can be prepared by polymerizing α-olefins, for example, ethene, propene, 1-butene, for example using Ziegler catalysts. It is possible to prepare homopolymers or copolymers of α-olefins. They have an amorphous structure compared with other polyolefins.

In the present document, an "α-olefin" is understood as including, according to the usual definition, an alkene of the sum formula $C_xH_{2x}$ (x being the number of carbon atoms), which has a C—C double bond at the first carbon atom (α-carbon). Examples for such α-olefins are ethylene, propylene, 1-butene, 1-pentene, 1-hexene, 1-heptene and 1-octene. Therefore, for example neither 1,3-butadiene nor 2-butene nor styrene are α-olefins within the meaning of this document.

The molecular weight $M_n$ is, for example, between 7,000 and 25,000 g/mol.

The term "polymer" as used in the present document includes, on the one hand, a collective of chemically uniform macromolecules produced by a polyreaction (polymerization, polyaddition, polycondensation) where the macromolecules differ with respect to their degree of polymerization, molecular weight and chain length. On the other hand, the term also comprises derivatives of said collective of macromolecules resulting from polyreactions, that is, compounds which are obtained by reactions such as, e.g., additions or substitutions, of functional groups in predetermined macromolecules and which may be chemically uniform or chemically non-uniform. The term also comprises so-called prepolymers, that is, reactive organic pre-adducts, the functional groups of which participate in the formation of macromolecules.

In the present document, "molecular weight" is defined as the number average molecular weight $M_n$ (number average).

The term "room temperature" as used in the present document refers to a temperature of 23° C.

The terms highlighted in bold in the present document, such as P, WH, PW, S1, S2 or the like serve to increase reading comprehension and identification.

The amount of polyolefin P is 30-60% by weight, for example, 40-50% by weight, based on the hot-melt adhesive composition.

The hot-melt adhesive composition contains at least one soft resin WH with a softening point between −10° C. and 40° C. Due to the fact that the soft resin WH is very close to the softening point at room temperature (23° C.), it is either already liquid or very soft at room temperature. A soft resin may be a natural resin or synthetic resin.

For example, such soft resins WH are medium- to relatively high-molecular weight compounds from the classes including paraffin resins, hydrocarbon resins, polyolefins, polyesters, polyethers, polyacrylates or amino resins.

The soft resin WH can have a softening point between 0° C. and 25° C., for example, between 10° C. and 25° C.

In an exemplary embodiment, the soft resin WH is a hydrocarbon resin, for example, an aliphatic $C_5$-$C_9$ hydrocarbon resin.

An aliphatic $C_5$ hydrocarbon resin that is commercially available under the trade name Wingtack® 10 from the company Cray Valley can be used as soft resin WH.

Further suitable soft resins are, for example, polyterpene resins, as are commercially sold, for example, as Sylvares® TR A25 by Arizona Chemical, USA, rosin esters and tall resin esters, as are commercially sold, for example, as Sylvatac® RE12, Sylvatac® RE10, Sylvatac® RE15, Sylvatac® RE 20, Sylvatac® RE 25 or Sylvatac® RE 40 by Arizona Chemical, USA. Further suitable soft resins are, for example, Escorez™ 5040 (Exxon Mobil Chemical).

Other hydrocarbon resins suitable as soft resins are, for example, Picco A10 (Eastman Kodak) and Regalite R1010 (Eastman Kodak).

The amount of soft resins WH is 30-60% by weight, for example, 40-50% by weight, based on the hot-melt adhesive composition. An amount below 30% by weight can be detrimental to the inherent tackiness of the hot-melt adhesive composition.

The hot-melt adhesive composition contains at least one polar-modified polyolefin wax PW.

Suitable polar-modified polyolefin waxes PW are produced by grafting polar olefin monomers, for example, α,β-unsaturated carboxylic acids and/or derivatives thereof, for example (meth)acrylic acid or maleic anhydride; and/or substituted and/or unsubstituted styrenes, to polyolefin waxes.

For example, the polar-modified polyolefin wax PW is a polyolefin wax grafted with maleic anhydride.

Suitable polyolefin waxes forming the basis for manufacturing polar-modified polyolefin waxes PW can be obtained by thermal decomposition of branched or unbranched polyolefin plastics or by direct polymerization of olefins. Suitable polymerization processes are, for example, free-radical processes, where the olefins, for example, ethylene, are reacted at high pressures and temperatures to give more or less branched waxes; processes, where ethylene and/or higher 1-olefins are polymerized using metal-organic catalysts, for example Ziegler-Natta or metallocene catalysts, to give unbranched or branched waxes.

For example, the polyolefin waxes are homo- and copolymers of various alkenes.

For example, the polyolefin waxes are homo- and copolymers of ethene and propene.

For example, the polyolefin waxes are homo- and copolymers produced using Ziegler or metallocene catalysts.

For example, the polar-modified polyolefin wax PW is a wax of ethene and propene homo- and copolymers grafted with maleic anhydride, for example, a polypropylene wax grafted with maleic anhydride.

The graft degree of the polar-modified polyolefin wax PW can exceed 1% by weight, for example, 3% by weight of polar olefin monomers, for example, maleic anhydride, by weight of the polyolefin wax. For example, said graft degree is between 2 and 15% by weight, for example, between 4 and 15% by weight, for example, between 8 and 12% by weight.

The polar-modified polyolefin wax PW can have a softening point between 100° C. and 200° C., for example, between 120° C. and 170° C.

The polar-modified polyolefin wax PW can have a melt viscosity at 170° C. of 10-10,000 mPa·s, for example, of 1,000-5,000 mPa·s.

In an exemplary embodiment, the polar-modified polyolefin resin PW is a polyethylene wax grafted with maleic anhydride or a polypropylene wax grafted with maleic anhydride.

For example, the amount of polar-modified polyolefin wax PW is between 1 and 20% by weight, for example, between 2.5 and 10% by weight, for example, between 3 and 7% by weight, based on the weight of the hot-melt adhesive composition. For example, if the amount is below 1% by weight, the polar-modified polyolefin wax PW has no effect on the adhesion of the hot-melt adhesive composition.

The hot-melt adhesive composition can contain further components. Suitable further components are, for example, components selected from the group comprising softeners, adhesion promoters, UV absorbing agents, UV and heat stabilizers, optical brightening agents, fungicides, pigments, colorants, fillers and desiccants.

It has been found that it is exemplary if the weight sum of all olefin-based polymers P that are solid at 25° C. and all soft resins WH and all polar-modified polyolefin waxes PW exceeds 60% by weight, for example, 80% by weight of the hot-melt adhesive composition.

Hot-melt adhesive compositions which include a polyolefin P that is solid at 25° C., a soft resin WH and a polar polyolefin wax PW can be advantageous. In addition to said components, exemplary compositions only contain insignificant, typically less than 5% by weight, for example, less than 1% by weight of amounts of other components. For example, the hot-melt adhesive composition includes a polyolefin P that is solid at 25° C., a soft resin WH and a polar polyolefin wax PW.

The preparation is effected in any suitable manner known to one skilled in the field of hot-melt adhesives.

The hot-melt adhesive compositions are liquefied by heating, which results in melting of the thermoplastic ingredients. The viscosity of the hot-melt adhesive compositions can be adapted to the application temperature. For example, the application temperature is between 100 and 200° C., for example, between 150 and 180° C. At this temperature, the adhesive is readily processable. In this temperature range, the viscosity determined according to Brookfield Thermosel can be 1,500-50,000 mPa s. If it is substantially higher, application can be very difficult. If it is substantially lower, the adhesive can be of such a low viscosity that it runs off the material surface for adhesive bonding during application before it hardens as a result of cooling. For example, the viscosity determined according to Brookfield Thermosel is 2,500-20,000 mPa·s within a temperature range from 150 to 180° C.

The solidification and hardening of the adhesive take place due to the cooling result in a rapid build-up of strength and high initial adhesive strength of an adhesive bond. When using an adhesive, it can be ensured that the adhesive bonding takes place within the time period in which the adhesive has not yet cooled too greatly, i.e., the adhesive bonding can take place while the adhesive is still liquid or at least still tacky and deformable.

It has been found that exemplary hot-melt adhesive compositions have a high initial strength and a high strength and flexibility in a wide temperature range.

Due to the absence of isocyanates, exemplary hot-melt adhesive compositions can be advantageous from the points of view of occupational hygiene and work safety.

Moreover, it has been found that due to the polar-modified polyolefin wax PW, for example, due to a polyolefin wax grafted with maleic anhydride, adhesion of the hot-melt adhesive composition to low-energy surfaces, for example, on polyethylene, is significantly improved. This result was unexpected since in the literature polar-modified polypropylene waxes have been known to be used as adhesion promoters for polar substrates in nonpolar adhesives due to their polar character. Improvement of the adhesion to low-energy surfaces, for example, to the very low-energy polyethylene, is surprising. Therefore, the hot-melt adhesive compositions have a broad adhesive spectrum on nonpolar plastics such as polyethylene and polypropylene, which can be adhesively bonded using the hot-melt adhesive compositions even without primers.

It has been found that exemplary hot-melt adhesive compositions have a very long shelf-life, possess good processing properties, for example, in the application temperature range ranging from 100 to 200° C., and are viscosity-stable at these temperatures, even over a relatively long time. Hardening takes place without odor, rapidly and, even in the case of applications in thick layers, without bubbles. The hot-melt adhesive composition can be characterized by good adhesion, for example, high immediate adhesion and tackiness, and high resistance to environmental degradation, for example, to aqueous media such as, e.g., surfactants, weak acids and bases, and it is not corrosive.

Exemplary hot-melt adhesive compositions can be advantageous due to their aging and temperature resistances.

The setting behavior of the hot-melt adhesive composition may be positively influenced by at least one existing soft resin WH. The hot-melt adhesive composition becomes so soft that a relatively thin adhesive layer can be caused to flow by applying pressure thereto even after cooling. For example, when using said composition in a waterproof membrane, this effect enables the composition to flow well onto the concrete. Thus, a high resistance to penetrating water is generated.

The hot-melt adhesive compositions described above have a wide variety of applications, typically in the construction and hygiene industries.

It has been found that the hot-melt adhesive compositions described above can optimally be used for the adhesive bonding of polyolefin materials to foams, fiber materials or films.

Furthermore, the hot-melt adhesive compositions are also very suitable for the adhesive bonding of sandwich panels.

A further exemplary aspect of the disclosure relates to a composite body having a first substrate S1, which is a polyolefin film, a hot-melt adhesive composition described above and a second substrate S2 wherein the hot-melt adhesive composition is arranged between the first substrate S1 and the second substrate S2.

FIG. 1 illustrates a schematic cross-section through such a composite body 1 which comprises a first substrate S1 2 and a second substrate S2 3 and a hot-melt adhesive composition 4 which is arranged between the first and the second substrates and thus adhesively bonds these two substrates to one another.

A "polyolefin film" is understood as, for example, flexible sheet-like polyolefins having a thickness ranging from 0.05 millimeter to 5 millimeters. They can therefore be rolled up. Thus, in addition to "films" (in the strict sense) of thicknesses of less than 1 mm, sealing sheets, as can be used for sealing tunnels, roofs or swimming baths, having a thickness of typically 1 to 3 mm, in special cases even of 5 mm maximum, are also used. Such polyolefin films can be produced by spreading, casting, calendaring or extrusion and are commercially available in rolls or are produced on site. They may have a single-ply or multi-ply structure. Polyolefin films can additionally contain other additives and processing agents, such as fillers, UV and heat stabilizers, plasticizers, lubricants, biocides, flameproofing agents, antioxidants, pigments, such as, for example, titanium dioxide or carbon black, and dyes. This means that even films containing less than 100% polyolefins can be designated as polyolefin films.

The second substrate S2, in many cases also designated as a carrier, may be of a different type and nature. The substrates can, for example, include plastics, for example, polyolefins or ABS, metal, coated metal, plastics, wood, wood-base materials or fiber materials. The substrate can be a solid, shaped body.

For example, the first substrate S1 is a polyolefin film and the second substrate S2 is a porous material, for example, a polyolefin foam or a polyolefin fiber material.

If required, the surface of the second substrate S2 may have been pretreated. For example, such a pretreatment may involve cleaning or application of a primer. For example, the application of primers is not necessary and not employed.

The described composite body can be an article of industrial manufacture, for example, in the construction industry, an article for sealing bases or buildings against breakthrough of water such as, for example, waterproof membranes.

For example, the described composite body is a waterproof membrane, wherein the first substrate S1 is a polyolefin film and the second substrate S2 is a porous material, for example, a foam or a fiber material.

Figure 2:
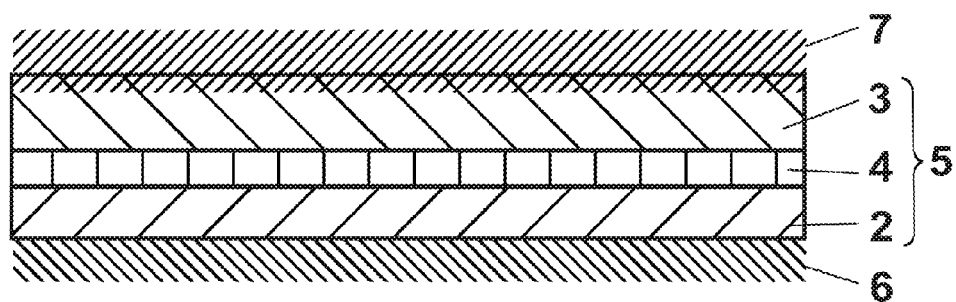
FIG. 2 is a cross-sectional view of a waterproof membrane, according to an exemplary aspect.

FIG. 2 illustrates such a waterproof membrane 5 in the built-in state. The first substrate S1 2 is arranged on the base 6 and the second substrate S2 3 provides the bond to the applied concrete 7 by being infiltrated by the applied concrete.

In this application, the base 6 can be horizontal or not. Moreover, the base can be soil, a building or formwork. The base can be a vertically positioned formwork of wood or steel girders. The base may also be insulating material.

When installed, concrete 7 can be arranged on the side of the second substrate S2 3 facing away from the first substrate S1 2 of such a composite body 1.

If the composite body is a waterproof membrane 5, the first substrate S1 2 can have a high resistance to water pressure and shows good values in tear propagation tests and perforation tests, which can be advantageous in the case of mechanical stress on construction sites.

A porous structure of the second substrate S2 3 can be beneficial for the elasticity of the waterproof membrane 5 since its resistance to tensile or shearing forces can be improved. On the other hand, it results in a good uptake of liquid concrete and thus in a good bond to both liquid and cured concrete. For example, this can be advantageous with large surface inclination angles to prevent concrete 7 from sliding off the second substrate S2.

For example, the second substrate S2 is a fiber material. In the present document, a fiber material is to be understood as a material composed of fibers. The fibers comprise or consist of organic or synthetic material. For example, they are cellulose, cotton, protein or synthetic fibers. As synthetic fibers, for example, fibers of polyester or a homo- or copolymer of ethylene and/or propylene or viscose are to be mentioned. Said fibers may be short or long fibers, spun, woven or unwoven fibers or filaments. Said fibers may be oriented or drawn fibers. It may be advantageous to use combinations of fibers having different geometries and compositions.

The fiber material can have voids. These voids are created by suitable manufacturing processes. For example, the voids are at least partially open and enable the permeation of liquid concrete and/or the above-mentioned hot-melt adhesive compositions.

A wide variety of processes known to the skilled person may be used to manufacture the body made of fibers. For example, bodies that are a fabric, a non-crimp fabric or a knitted fabric are used.

The fiber material may be a loose material of staple fibers or filaments usually adhering to one another due to the fibers' own adhesion. In this case, the single fibers may have an exemplary orientation or be non-oriented. The body of fibers can be bonded mechanically by needle punching, intermeshing or intermingling by means of sharp water jets. Exemplary as fiber material is a felt or a fleece. Further exemplary are fiber materials having a mesh number of 5-30 per 10 cm. Such layers of fiber materials can offer the same advantages as mentioned above for said porous materials and can be produced at low cost. Fiber materials can usually be manufactured very uniformly, thus providing a comparable penetration with concrete.

The second substrate S2 includes a thermoplastic material and the material is selected from the group comprising high-density polyethylene (HDPE), polyethylene terephthalate (PET), polystyrene (PS), polypropylene (PP), polyvinyl chloride (PVC), polyamide (PA) and combinations thereof.

If the composite body is a waterproof membrane 5, the second substrate S2 3 can have a thickness of 0.1-1 mm, for example, of 0.2-0.6 mm, for example, of 0.4-0.55 mm.

The hot-melt adhesive composition 4 is arranged between the first substrate S1 2 and the second substrate S2 3. However, it can also be advantageous if the hot-melt adhesive composition 4 penetrates the substrate S2 partially or completely, for example, partially, thus resulting in a better bond to the hot-melt adhesive composition.

Furthermore, in such a composite body, when installed, it may be advantageous for the bond of the waterproof membrane to the concrete 7 if the concrete contacts the hot-melt adhesive composition 4 at least partially. This can be achieved by letting the concrete penetrate the porous material and thus contact the hot-melt adhesive composition and/or letting the hot-melt adhesive composition penetrate the porous material and thus contact the concrete.

The above-mentioned waterproof membranes comprising an exemplary hot-melt adhesive composition and the use of an exemplary hot-melt adhesive composition in said membranes can be advantageous in that, on the one hand, the hot-melt adhesive composition enables the use of hard-to-bond polyethylene films that can be advantageous due to their high resistance to water pressure. On the other hand, due to its hydrophobicity and resistance to liquids, its non-corrosive properties and its good adhesion properties, the hot-melt adhesive composition can ensure a good bond between the first substrate S1 and the second substrate S2. This can reduce or prevent, for example, voids between the first substrate S1 and the second substrate S2 and can hinder water to penetrate the waterproof membrane in the case of leakage.

EXAMPLES

TABLE 1

| Characterization of the used starting materials and the designations thereof | |
|---|---|
| P | Poly-α-olefin, propene-rich Molecular weight ($M_n$): between 17,000 and 20,000 g/mol. Melt viscosity (190° C., DIN 53 019): approx. 50,000 mPa · s Softening point (ring and ball, DIN EN 1238): 100° C. Density: approx. 0.85 g/cm$^3$ |
| WH | Wingtack ® 10 (Softening point: 10° C.) |
| PW | Polypropylene grafted with maleic anhydride (obtained by metallocene catalysis) Melt viscosity (170° C., DIN 53 018): approx. 1,100 mPa · s Softening point (ring and ball, DIN EN 1238): 160° C. Density: approx. 0.90 g/cm$^3$ Drop point: approx. 160° C. |
| Stab. | Phenolic heat stabilizer |

A hot-melt adhesive composition ("HSZ") was prepared by mixing the ingredients according to the parts by weight indicated in Table 2 at a temperature of 150° C. and under an inert atmosphere in a mixer.

Viscosity

After melting the hot-melt adhesive composition HSZ in a sealed tube for 20 minutes at 140° C. in a hot cabinet, 9.7 g of adhesive were weighed into a disposable sleeve and thermostated for 20 minutes in a viscometer at the respective temperature indicated in Table 2. The measurement of the viscosity was effected at 150° C., 160° C., and 180° C. at 10 revolutions per minute on a Brookfield DV-2 Thermosel viscometer using spindle No. 27. The value resulting after a 5-minute measurement is chosen as the viscosity. In Table 2, the measured value at 150° C. is indicated as "$Visk_{150}$", that at 160° C. as "$Visk_{160}$", that at 180° C. as "$Visk_{180}$" and that at 200° C. as "$Visk_{200}$".

Softening Point

The softening point was measured by the Ring-And-Ball Method according to DIN EN 1238.

Build-Up of Early Strength

The hot-melt adhesive composition HSZ was melted and applied at an adhesive temperature of 160° C. to PP test specimens (100 mm×25 mm×5 mm) and joined to a second PP test specimen (adhesive thickness: 1 mm, overlap area: 25 mm×25 mm). The early strength was determined by measuring these shear tensile strength test specimens after 30 min, measured from application of the molten hot-melt adhesive composition, by means of a Zwick Z020 tensile tester at a measuring speed of 10 mm/min at 23° C. and 50% relative humidity. The measured maximum tensions ("$\sigma_{max}$") after 30 min are stated in Table 2.

TABLE 2

| Hot-melt adhesive composition HSZ. | |
| --- | --- |
| P | 47.5% by weight |
| WH | 47.5% by weight |
| PW | 4.75% by weight |
| Stab. | 0.25% by weight |
| Softening point [° C.] | 131 |
| $Visc_{150}$ [Pa·s] | 9.0 |
| $Visc_{160}$ [Pa·s] | 6.0 |
| $Visc_{180}$ [Pa·s] | 3.5 |
| $Visc_{200}$ [Pa·s] | 2.2 |
| $\sigma_{max}$ (30 min) [N/mm$^2$] | 0.1 |

The results of Table 2 show that the hot-melt adhesive composition HSZ has a rapid build-up of strength.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A hot-melt adhesive composition, comprising:
   a) a polyolefin P, which is solid at 25° C., wherein the amount of the polyolefin P is 40-50% by weight, based on the hot-melt adhesive composition;
   b) at least one soft resin WH with a softening point, measured by the Ring-And-Ball Method according to DIN EN 1238, between −10° C. and 40° C., wherein the amount of the at least one soft resin WH is 40-50% by weight, based on the hot-melt adhesive composition; and
   c) at least one polar-modified polyolefin wax PW, wherein the polar polyolefin wax PW has a softening point between 120° C. and 170° C., wherein the amount of the at least one polar-modified polyolefin wax PW is 1-20% by weight, based on the hot-melt adhesive composition, wherein the polar-modified polyolefin wax PW is a polyethylene wax grafted with maleic anhydride or a polypropylene wax grafted with maleic anhydride, wherein the graft degree of the polar-modified polyolefin wax PW is between 12% and 15% by weight of the polar-modified polyolefin wax PW,
   wherein the composition consists of the polyolefin P, the at least one soft resin WH, and the at least one polar-modified polyolefin wax PW, or the composition comprises less than 1% by weight of the total components other than the polyolefin P, the at least one soft resin WH, and the at least one polar-modified polyolefin wax PW.

2. A hot-melt adhesive composition comprising:
   a) a polyolefin P, which is solid at 25° C., wherein the polyolefin P has a softening point, measured by the Ring-And-Ball Method according to DIN EN 1238, between 70° C. and 170° C., wherein the amount of the polyolefin P is 40-50% by weight, based on the hot-melt adhesive composition;
   b) at least one soft resin WH with a softening point, measured by the Ring-And-Ball Method according to DIN EN 1238, between −10° C. and 40° C., wherein the amount of the at least one soft resin WH is 40-50% by weight, based on the hot-melt adhesive composition; and
   c) at least one polar-modified polyolefin wax PW, wherein the amount of the at least one polar-modified polyolefin wax PW is 1-20% by weight, based on the hot-melt adhesive composition, wherein the polar-modified polyolefin wax PW is a polyethylene wax grafted with maleic anhydride or a polypropylene wax grafted with maleic anhydride, wherein the graft degree of the polar-modified polyolefin wax PW is between 12% and 15% by weight of the polar-modified polyolefin wax PW,
   wherein the composition consists of the polyolefin P, the at least one soft resin WH, and the at least one polar-modified polyolefin wax PW, or the composition comprises less than 1% by weight of the total components other than the polyolefin P, the at least one soft resin WH, and the at least one polar-modified polyolefin wax PW.

3. The hot-melt adhesive composition according to claim 1, wherein the polyolefin P is a thermoplastic poly-α-olefin.

4. The hot-melt adhesive composition according to claim 1, wherein the soft resin WH has a softening point between 0° C. and 25° C.

5. The hot-melt adhesive composition according to claim 1, wherein the soft resin WH is a hydrocarbon resin.

6. A hot-melt adhesive composition comprising:
   a) a polyolefin P, which is solid at 25° C., wherein the amount of the polyolefin P is 40-50% by weight, based on the hot-melt adhesive composition;
   b) at least one soft resin WH with a softening point, measured by the Ring-And-Ball Method according to DIN EN 1238, between −10° C. and 40° C., wherein the amount of the at least one soft resin WH is 40-50% by weight, based on the hot-melt adhesive composition; and
   c) at least one polar-modified polyolefin wax PW, wherein the polar polyolefin wax PW has a softening point between 120° C. and 170° C., wherein the amount of the at least one polar-modified polyolefin wax PW is 1-20% by weight, based on the hot-melt adhesive composition, wherein the polar-modified polyolefin wax PW is a polyethylene wax grafted with maleic anhydride or a polypropylene wax grafted with maleic anhydride, wherein the graft degree of the polar-modified polyolefin wax PW is between 12% and 15% by weight of the polar-modified polyolefin wax PW,
   wherein the composition consists of the polyolefin P, the at least one soft resin WH, and the at least one polar-modified polyolefin wax PW, or the composition comprises less than 1% by weight of the total components other than the polyolefin P, the at least one soft resin WH, and the at least one polar-modified polyolefin wax PW.

7. A method of bonding, comprising bonding a first substrate to a second substrate with the hot-melt adhesive composition according to claim 1.

8. A composite body, comprising:
   a) a first substrate S1, which is a polyolefin film;
   b) the hot-melt adhesive composition according to claim 1; and
   c) a second substrate S2,
   wherein the hot-melt adhesive composition is arranged between the first substrate S1 and the substrate S2.

9. The composite body according to claim 8, wherein the first substrate S1 is a polyolefin film and the second substrate S2 is a polyolefin foam or a polyolefin fiber material.

10. The composite body according to claim 8, wherein concrete is arranged on a side of the second substrate S2 that faces away from the first substrate S1.

11. The composite body according to claim 10, wherein the second substrate S2 is a porous material and the concrete at least partially contacts the hot-melt adhesive composition.

12. The hot-melt adhesive composition according to claim 1, wherein the polyolefin P has a softening point, measured by the Ring-And-Ball Method according to DIN EN 1238, between 80° C. and 120° C.

13. The hot-melt adhesive composition according to claim 1, wherein the polyolefin P has a softening point, measured by the Ring-And-Ball Method according to DIN EN 1238, between 90° C. and 110° C.

14. The hot-melt adhesive composition according to claim 1, wherein the polyolefin P is an atactic poly-α-olefin (APAO).

15. The hot-melt adhesive composition according to claim 1, wherein the soft resin WH has a softening point between 10° C. and 25° C.

16. The hot-melt adhesive composition according to claim 1, wherein the soft resin WH is an aliphatic $C_5$-$C_9$-hydrocarbon resin.

17. The hot-melt adhesive composition according to claim 1, wherein the amount of polar polyolefin wax PW is 2.5-10% by weight, based on the hot-melt adhesive composition.

18. The method according to claim 7, wherein the first substrate includes a polyolefin material, and the second substrate includes a foam, fiber material or film.

19. The hot-melt adhesive composition according to claim 1, wherein the polyolefin P consists of an atactic poly-α-olefin (APAO).

20. The hot-melt adhesive composition according to claim 2, wherein the polyolefin P consists of an atactic poly-α-olefin (APAO).

21. A hot-melt adhesive composition, consisting of:
a) a polyolefin P, which is solid at 25° C., wherein the amount of the polyolefin P is 40-50% by weight, based on the hot-melt adhesive composition;
b) at least one soft resin WH with a softening point, measured by the Ring-And-Ball Method according to DIN EN 1238, between −10° C. and 40° C., wherein the amount of the at least one soft resin WH is 40-50% by weight, based on the hot-melt adhesive composition;
c) at least one polar-modified polyolefin wax PW, wherein the polar polyolefin wax PW has a softening point between 120° C. and 170° C., wherein the amount of the at least one polar-modified polyolefin wax PW is 1-20% by weight, based on the hot-melt adhesive composition, wherein the polar-modified polyolefin wax PW is a polyethylene wax grafted with maleic anhydride or a polypropylene wax grafted with maleic anhydride, wherein the graft degree of the polar-modified polyolefin wax PW is between 12% and 15% by weight of the polar-modified polyolefin wax PW; and
d) a phenolic heat stabilizer.

* * * * *